United States Patent [19]
Havlena et al.

[11] Patent Number: 6,106,785
[45] Date of Patent: Aug. 22, 2000

[54] POLYMERIZATION PROCESS CONTROLLER

[75] Inventors: Vladimír Havlena; Josef Horák, both of Prague, Czech Rep.; Jan Jelinek, Plymouth, Minn.

[73] Assignee: Honeywell Inc., Minneapolis, Minn.

[21] Appl. No.: 08/885,562

[22] Filed: Jun. 30, 1997

[51] Int. Cl.$^7$ .............................. G05D 23/00; G05D 7/00
[52] U.S. Cl. ...................... 422/109; 422/108; 422/110; 422/62
[58] Field of Search ..................... 422/108, 109, 422/116, 110–111, 62; 364/150, 151, 528.01, 528.03, 528.04

[56] References Cited

U.S. PATENT DOCUMENTS

| | | | |
|---|---|---|---|
| 4,265,263 | 5/1981 | Hobbs | 137/2 |
| 4,619,901 | 10/1986 | Webb et al. | 436/55 |
| 5,343,407 | 8/1994 | Beauford et al. | 364/528.05 |
| 5,519,605 | 5/1996 | Cawlfield | 364/151 |
| 5,682,309 | 10/1997 | Bartusiak et al. | 364/149 |
| 5,730,937 | 3/1998 | Parikes | 422/62 |
| 5,748,467 | 5/1998 | Qin et al. | 364/148.05 |

FOREIGN PATENT DOCUMENTS 9641822A  12/1996  WIPO .

OTHER PUBLICATIONS

Ganesh N et al: "Model Based Control of a Polymerization Reactor Using a Distributed Control System", Proceedings of the Industrial Computing Conference, Anaheim, Oct. 27–31, 1991, vol. 1, No. CONF.1, Oct. 27, 1991.

A.Helbig et al: "Analysis and Nonlinear Model Predictive Control of the Hylla Haase Benchmark algorthim" UKACC International Conference on Control 96, vol. 2, Sep. 2, 1996, pp. 1172–1177.

J.Choi et al: "Nonlinear Process Model Based Control of a Batch Polymerization Reactor", Proceedings of the American Control Conference, vol. 5, Jun. 4, 1997, pp. 3455–3459.

H.Ni et al: "Fuzzy Logic Supervised Ann Feedforward Control for a Batch Polymerization Reactor", Proceedings of the American Control Conference, vol. 3, Jun. 21, 1995, pp. 1777–1781.

P.Hildago et al: "Nonlinear Model Predictive Control of Styrene Polymerization at Unstable Operating Points", Computers.Chem.Enginng, vol. 14, No. 4–5, May 1990, pp. 481–494.

S.Yi et al: "Predictive Learning Control for a Batch Polymerization Reactor" Proceedings of the 13$^{th}$ World Congress IFAC vol. M. Chemical Process Control, vol. M, Jun. 30, 1996, pp. 337–342.

*Primary Examiner*—Marian C. Knode
*Assistant Examiner*—Susan Ohorodnik
*Attorney, Agent, or Firm*—John G. Shudy, Jr.

[57] ABSTRACT

A batch polymerization process controller using inferential sensing to determine the integral reaction heat which in turn is used to indicate the degree of polymerization of the reaction mixture batch. The system uses a reaction temperature compared with a desired temperature, and the result is used as a feedback to monitor and control the process. One version of the process controller also uses a feedforward signal which is an integral reaction heat indication from a process model. In another version of the process controller, the integral reaction heat is compared with a desired integral reaction heat, and result is used as another feedback to monitor and control the process. Heat production and reaction temperature profiles may be used, along with the thermokinetic equations to determine the polymerization process and reactor models which are utilized by the process controller to optimize the polymerization process in terms of efficient use of cooling water and desired polymerization of each mixture batch.

11 Claims, 8 Drawing Sheets

OTHER PUBLICATIONS

McGreavy "On–line Computer Control System for Chemical Reaction Processes," Computers & Computer Engineering, vol. 7, No. 4, 1983, pp. 529–566.

Hamielec, et al., "Latex Reactor Principles: Design, Operation, and Control," Ch. 9, in Piirma (editor) *Emulsion Polymerization*, Academic Press, New York, 1982, pp. 319–353.

Chien, et al. "On–line Sensors for Polymerization Reactors," J.Macromol.Sci.–Rev.Macromol.Chem.Phys., C30(1), 1990, pp. 1–42.

Padmanabhan, et al., "Control of Chemical Reactors," Ch. 13, in Lapidus, et al. (editors) *Chemical Reactor Theory: A Review*, Prentice Hall, New Jersey, 1977, pp. 532–582.

MacGregor, et al., "Control of Polymerization Reactors: A Review," Polymer Process Engineering, vol. 2, 1984, pp. 179–206.

Nokimos, et al., "Multivariate SPC Charts for Monitoring Batch Processes," Technometrics, vol. 37, Feb. 1995, pp. 41–59.

Soroush et al., "Nonlinear Control of a Batch Polymerization Reactor: An Experimental Study," AIChE Journal, vol. 38, No. 9, Sep. 1992, pp. 1429–1448.

Ray, "Polymerization Reactor Control," 1985 American Control Conference, Jun. 19–21, 1985, V.2, Boston, pp. 842–848.

Kasanovitch, et al., "Multi–Way PCA Applied to an Industrial Batch Process," 1994 American Control Conference, Jun. 29–Jul. 1, 1994, V.2, Baltimore, pp. 1294–1298.

Elicabe, et al., "Estimation and Control in Polymerization Reactors: A Review," Polymer Engineering and Science, vol. 28, No. 3, Feb. 1988, pp. 121–135.

Zhang, et al., "Neural Network Based Estimators for a Batch Polymerization Reactor," DYCORD+'95, 4th IFAC Dynamics and Control of Chemical Reactors, Copenhagen, Denmark, 1995, pp. 129–133.

Jarupintusophon, et al., "Realistic Model–Based Predictive and Adaptive Control of Batch Reactor," Computers Chem. Eng. vol. 18, Supp., 1994, pp. S445–449.

Rose, Ch. 10, *Chemical Reactor Design in Practice*, Elsevier, 1981, pp. 281–312.

POLYMERIZATION PROCESS CONTROLLER

BACKGROUND

The invention pertains to polymerization reactions, particularly to monitor and control the rate and the amount of conversion in such reactions. More particularly, the invention pertains to accurately determining the rate and amount of conversion at a particular moment in a polymerization reaction so as to control the rate of conversion and to optimize cooling resources.

Most polymerization reactions today are run open loop with respect to the product quality (end-use) properties. Also operations involved in the manufacturing process are scheduled by a simple timer without attention to the actual progress of reaction.

In the last decade, the affordability of powerful computers finally made it possible to exploit the advanced control concepts control theorists have been developing since the 1960's. As a result, control of continuous processes like refinery distillation columns or power generation units has seen a rapid evolution from single loop proportional, integral and differential (PID) controllers to multivariable predictive controllers with built-in constraint optimization whose performance cannot be matched by the old PID solutions.

For a number of reasons, this progress so far has avoided batch processes. Control wise, most batches are still run the way they were thirty or more years ago. If there was a change, it affected control hardware, but not control algorithms. A batch recipe still prescribes time profiles of temperatures or pressures to be followed by a batch reactor in order to make the product. Feedback controllers, usually PID's, are routinely used to make the batch track the recipe in the presence of variations in feedstock concentration and purity, catalyst activity, reactor fouling and so on.

Maintaining batch recipe temperatures and pressures is important but it should not be the control objective. After all, the process owner does not sell batch temperatures or pressures. They are mere process parameters and, by themselves, are not even sufficient ones. It is well known and exemplified below for the case of polymerization processes, that two batches with perfectly identical temperature and pressure profiles can still have different rates at which monomer is converted into polymer, and thus yield products with inconsistent quality. When comes to the end-use parameters of the real product, which are determining its marketable quality, most batch processes are still run open loop, with all the negative consequences that an open loop recipe execution entails.

With the present invention, that approach is replaced with a feedback controller for polymerization processes that closes the loop using a measurement directly tied to the product's marketable quality, and thus employs feedback to eliminate quality variations and inconsistencies due to the fluctuations of process inputs and operating conditions.

The invention is a polymerization control that allows the user to specify independently the reaction mixture temperature and the degree of monomer conversion profiles as a function of time, and execute them under feedback control. This both improves the run-to-run consistency of the product and reduces the uncertainty of the reaction time and coolant consumption at any given instant. Because the coolant availability often is the limiting factor of production capacity, the improved predictability of individual batch runs offers an opportunity to improve batch planning and scheduling and thus increase the plant yield without expensive retrofits.

SUMMARY OF THE INVENTION

This invention enables the controller to employ feedback for the control of product properties without the need for specialty sensors to measure the properties and run the polymerization process on the basis of its inner time reflecting its actual progress. As a result, the invention makes it possible, first, to manufacture polymers with consistent quality and, second, to improve process yield by allowing for better utilization of the available cooling capacity without sacrificing process safety.

The invention includes an inferential sensor, whose concept is based on the observation that for polymerization processes, in which heat is released by a single reaction, the amount of heat released is proportional, albeit in a nonlinear way, to the degree of the monomer conversion. Hence, by carefully calculating the reactor's thermal balance on-line one can continuously infer the degree of conversion and use it for control. Once the actual degree of conversion can be determined and ultimately controlled, one can also control the cooling duty of the reactor and thus make it conform with the cooling capacity allotted to it by the plant scheduler.

Superficially, an advanced batch control system utilizing the inferential sensor looks very much the same as a conventional one. In both cases, measurements of temperatures and flows of the reactor coolant as it enters and leaves the reactor jacket or cooling coil will constitute the bulk of input data. In addition to that data, the inferential sensor may require additional data reporting temperatures at some other reactor spots and on the amounts and temperatures of feedstocks and catalysts. If some data on their composition are available, they can also be used with advantage for a more accurate inference.

The significant difference is in what the controllers do internally with the data. In a conventional batch controller, the data are used directly to control the reactor mixture temperature by manipulating the incoming coolant flow and temperature. In an advanced controller, the data are fed into the inferential sensor instead, where they are used to infer the current value of the degree of monomer conversion. This quantity is then passed to the controller part of the advanced batch controller.

Even though the inferential sensor could be implemented as a stand-alone device and thus resemble physical sensors, this option is unlikely. The reason is that the sensor involves a nonlinear dynamic model of both the process and the reactor, whose state must be kept in sync or coordinated with reality using a state estimation algorithm driven by the measured temperatures and flows. Once the model is available, it is shared with the advantage of a model-based (nonlinear) controller.

Polymerization reactions are exothermic (i.e., a chemical change in which there is a liberation of heat, such as combustion). The overall amount of heat released by a reaction from its start up to a given instant depends on how much of the monomer(s) has been converted into polymer. This measure of released heat indicating the degree of monomer conversion is a more reliable indicator of reaction progress than physical time because the same reaction can be running slower or faster depending on the initiator (i.e., catalyst) activity, reactant purity and other effects that may be difficult to measure directly. Moreover, for many polymerization reactions the degree of conversion is linked to the product quality and thus can be used for closing the loop for the product quality feedback control in place of specialty sensors.

The degree of conversion is not measured directly, but the invention involves inferring its running value by dynamically evaluating the reactor heat balance. This invention involves four concepts. First, there is the way of inferring the degree of conversion from the dynamic evaluation of the reactor heat balance. Second, the use of the degree of conversion replaces specialty sensors for feedback control with respect to the product quality (end-use) properties. Third, the use of the degree of conversion replaces physical time for the timing of process related operations like valve opening and closing, controlling the heat supply/removal, dosing the reactants, and so forth. Fourth, the sensor allows an accurate prediction of the batch evolution and thus makes it possible to accurately predict the cooling need profile from the current instant out to the batch termination.

In this invention, the reaction mixture temperature and the integral heat rate are treated as two independent process variables. This approach provides the user the freedom to specify batch recipes in a way that defines the evolutions of either variable during the batch run, and to execute them under tight, high performance control. Because the degree of monomer conversion is proportional to the integral heat rate for many important polymers including PVC, controlling the two variables gives the user independent control over two basic determinants of product quality. Even more importantly, such control fully defines the heat release at every instant of the batch run, thus making it possible to better utilize the available cooling capacity through more reliable planning and scheduling. To control the temperature and integral heat rate independently, the proposed method manipulates the amount of heat added to or taken out of the reaction and the amounts of the initiator(s) and inhibitor added during the batch run.

The present invention improves the yield of a PVC or polymerization manufacturing plant in two ways. First, this approach provides better feedback control of individual reactors, thus reducing the uncertainties of the reaction time and coolant consumption at any given instant. Because the benefit of plantwide planning and scheduling is dependent on the quality of predictions that were used for the plan and schedule development, better reactor control is a technological enabler of better planning and scheduling. Specifically, more reliable predictions of the coolant consumption allow the planner to run the plant with smaller cooling capacity margins without sacrificing the plant safety, thus increasing the plant yield. The controller of this invention can accelerate or decelerate the reaction without changing the reaction mixture temperature. Consequently, it can reduce the reaction time without sacrificing the product quality by taking advantage of any available cooling capacity. Second, this approach improves run-to-run product consistency and allows one to tighten the product specifications, which also adds to the yield increase, by reducing the off-specification production.

It is well known that some polymers could be produced by reactions running at greater speeds without any significant degradation of their quality, if only the reactors used could handle the increased heat flow. A good example is the manufacturing of PVC by the suspension process. A PVC plant in Canada uses water from a river as a coolant for its reactors. In the winter, when the water temperature is about 0.6 degrees Celsius (i.e., 33 degrees Fahrenheit), a batch takes about 5 hours to complete. However, in the summer, when the river water temperature raises to 22 degrees C. (72 degrees F.), the same batch, with comparable product quality, takes 8 to 9 hours, because the drop in the available cooling capacity forces the plant operator to slow down the reaction rate by using smaller amounts of the initiator.

In the above example, the coolant's supply is unlimited and the restriction comes from its increased temperature and limited water circulation flow through the reactors' jackets. Another example is a PVC plant that uses chilled water as the coolant for its jacketed reactors. The plant has a centralized utility which supplies water to a dozen or so reactors. Because the chilled water is expensive and its supply is limited, water exiting the reactors is partly recycled by mixing it with the freshly chilled water coming directly from the cooling towers. This creates a variable production environment, wherein the availability of the chilled water depends on the number of batches currently in progress as some reactors are always being charged or discharged, while others are temporarily out of service for cleaning and maintenance. Also, the chilled water temperature may fluctuate with the weather and the time of the day.

Before starting a batch, the operator must make a decision on how fast he can afford to run it without risking a temperature runaway and choose the appropriate amount of the initiator(s) which is then added to the reactor charge. To some degree, this decision is guesswork as the operator has to consider the effects of gradual deposit buildup on the reactor walls on heat removal. Once the reaction gets going, the operator can, in principle, speed it up or slow it down manually by adding the initiator or inhibitor, respectively, but this is not normally done. Once started, the batch is run open loop without further operator interference until its completion, which is indicated by the pressure drop in the reactor.

Given the uncertainty concerning the cooling capacity that will be actually available during the upcoming batch run and the impossibility to exactly determine the initiator dosing beforehand and to correct it later, the operator has to play it safe and make decisions that on the average might be overly conservative. This cuts into the reactor yield. Obviously, a better control over the actual rates of individual reactors in the plant would make it possible to reduce the current technological margins without endangering plant safety and thus create an opportunity to employ tighter plantwide optimization.

If one had better control over the reaction progress, then one could even think about more unusual ways to increase the plant yield. Currently, for each reaction the operator defines its speed before it begins by dumping a particular amount of the initiator(s) into the mixture. But there might be a window of opportunity when a large amount of chilled water is available, say, for two hours, because a couple of other reactors happened to finish simultaneously and have to be discharged and recharged. A batch controller that would allow the operator to temporarily accelerate the running reactions for the two hours to take advantage of the unexpectedly available cooling capacity and then bring them back to the original rate by applying a suitable amount of an inhibitor, without disturbing the reaction mixture temperature, would further improve the plant yield.

Making the batch follow a given temperature and conversion rate profiles not only improves the quality and run-to-run consistency of its product but, perhaps even more importantly, enables one to make accurate predictions of the heat release during the batch run. As a result, one can make reasonable and justifiable provisions for the expected cooling duty needed to keep the mixture at the desired temperature all the way up to the reaction end, and thus better utilize available plant resources through more reliable plantwide planning and scheduling.

The present advanced batch control, along with the follow-up plantwide optimization it enables, may have a major economic impact on plant performance. Consider, for example, a plant with fifteen reactors running so that the cooling capacity reserve is 10 percent. Since the cooling availability is the limiting factor, reducing the reserve to four percent would increase its output by six percent, which is almost tantamount to adding another reactor to the plant, without the expense of its construction and maintenance.

DESCRIPTION OF THE EMBODIMENT

Figure 1:
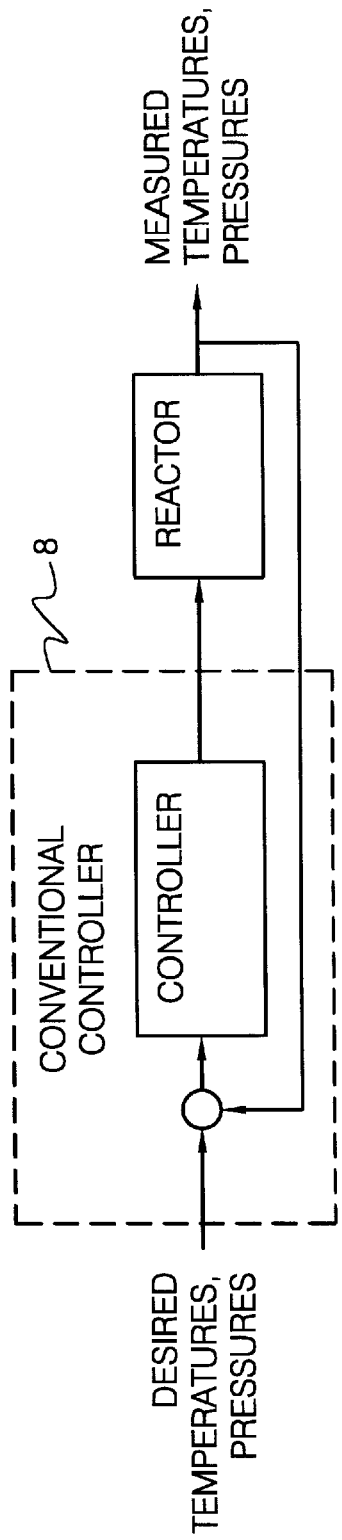
FIG. 1 is a diagram of a conventional polymerization reactor controller for batch control.
Figure 2:
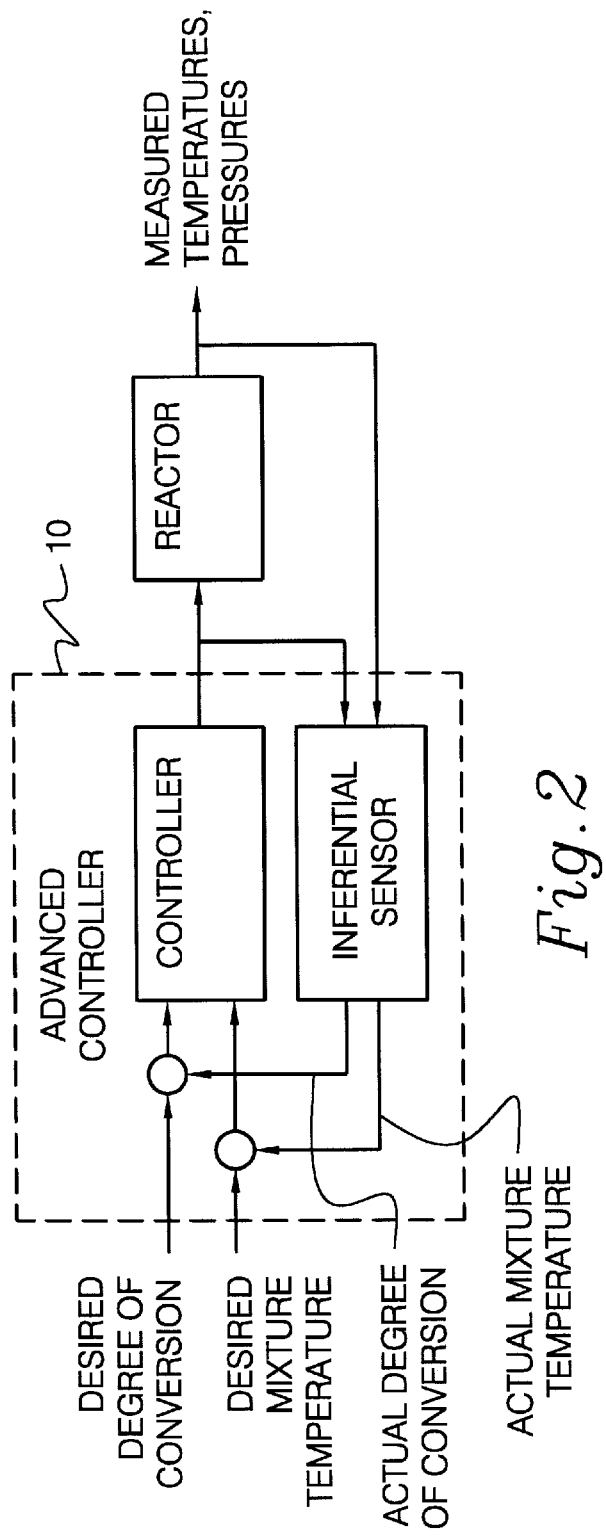
FIG. 2 is a diagram of the present polymerization reactor controller for batch control.

FIG. 1 shows a conventional batch controller 8. An advanced, high performance controller 10 is shown in FIG. 2. Such controller needs more information about the process being controlled. One needs to reconcile the nonlinear nature of batches that calls for a one-of-a-kind, specialized controller for every polymerization process, with business requirements preferring a single controller easily customizable for as large a number of processes as possible. It is best to bring a garden variety of polymerization processes under a common umbrella.

It is unlikely that there will ever be specialty sensors for all kinds of end-use properties various polymers may have. If there is going to be a generic controller for batch polymerization processes, then it will have to rely on inferential sensing of the properties instead of direct measurement of them, and such an inferential sensor will have to be an inseparable part of the controller design. The sensor will infer its readings from the measurements of generic physical variables such as temperatures, pressures, flows, and so forth, that are easily obtainable from commodity sensors. Setting up the sensor will constitute a major part of the tuning of the controller for a particular application.

The present invention is applicable for a large class of polymerization processes of practical importance. This approach is based on an observation that for many processes, the degree of monomer conversion into polymer is proportional to the overall amount of heat released by the reaction since its start. Because the speed of conversion, plotted as a function of time, has a strong effect on molecular characteristics of the resulting polymer chains and, therefore, the polymer end-use properties, ensuring repeatable time profiles of the conversion speeds, are one of the keys to consistent product quality. One cannot easily measure the degree of conversion, but can develop algorithms which permit one to calculate estimates of the overall reaction heat, which in turn can be utilized as an inferred process variable for feedback control. Unlike the degree of conversion, measurement methods needed to monitor the thermal conditions of a reaction are independent of a particular polymer being produced, thus resulting in a preferred generic approach.

Figure 3:
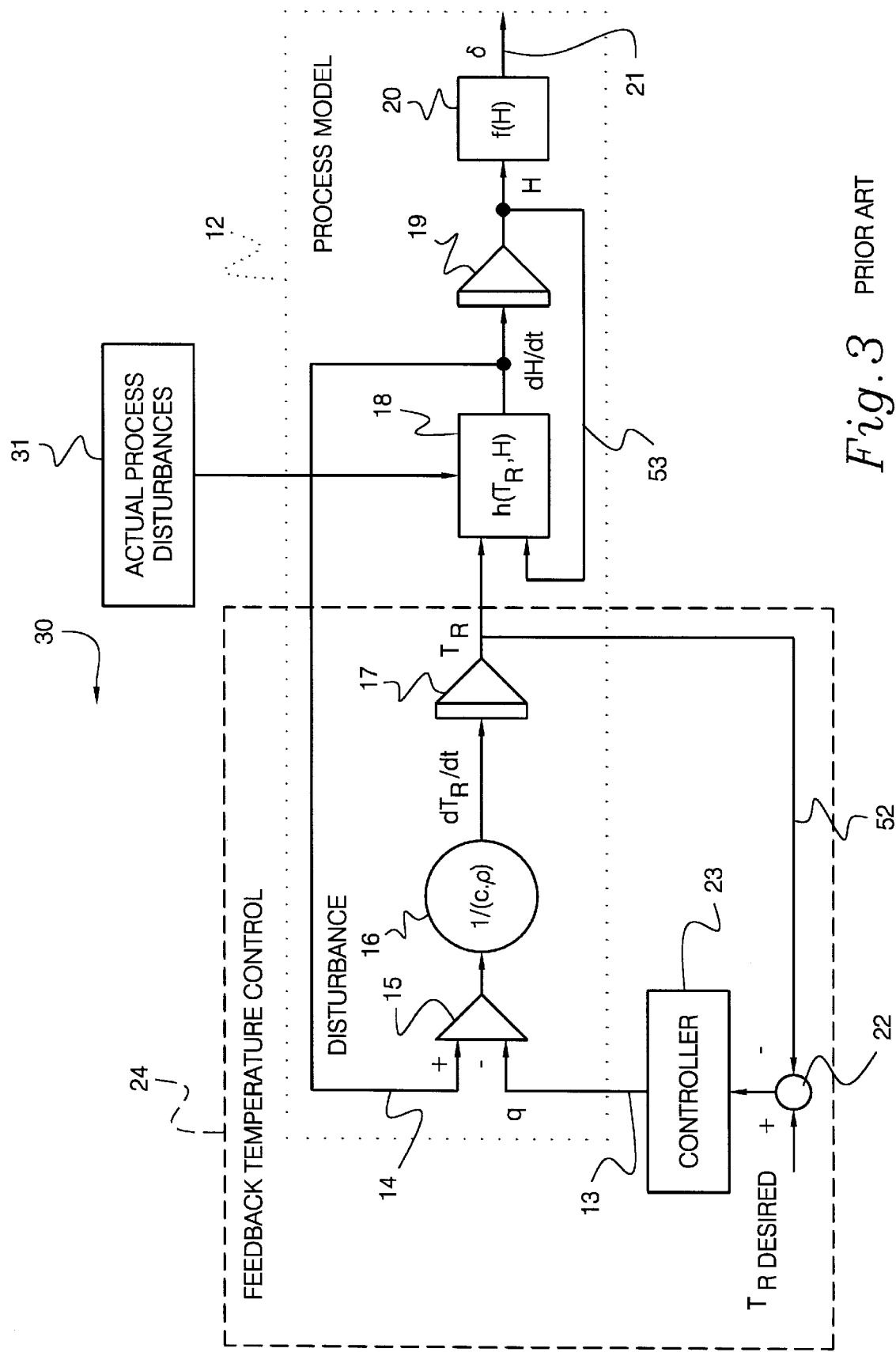
FIG. 3 shows the inability, in principle, of existing approaches based on controlling the reaction temperature $T_R$ to reject process disturbances affecting the conversion rate. This figure depicts a polymerization reaction by means of the thermokinetic equations, with an added temperature control loop.

First, there is a way for inferring the integral reaction heat of a polymerization reaction and its use for control. Initially, two uses of the inferred integral reaction heat are apparent. First, the integral reaction heat is used as another state variable of the process and used to improve control of the reaction mixture temperature in the second phase of a polymerization process, which is called the temperature tracking mode of controller. (The first one is the startup mode, which gives way to the temperature tracking mode when the controller switches from heating the mixture to cooling it.) FIG. 3 shows a conventional control system 30 having a reaction mixture temperature feedback link 52. For the sake of explanation, the process behavior is characterized by the thermokinetic model, which reflects one's understanding of how the process works. The sensor's applicability to polymerization process control, as shown in FIG. 3, is useful for many polymers, but of limited value for others. If the reaction mixture temperature $T_R$ is to be held constant throughout the batch process, as is the case, for example, in the PVC manufacturing; then the temperature control task is rather simple. In other words, for the PVC case, after startup there is no demanding temperature profile with steep up and down ramps for the control system to track. It is no surprise, then, that conventional control systems can maintain the temperature within ±0.3 degree C. (0.5 degree F.) and PVC manufacturing experts do not expect any product quality improvement from a more accurate temperature control.

Figure 4A:
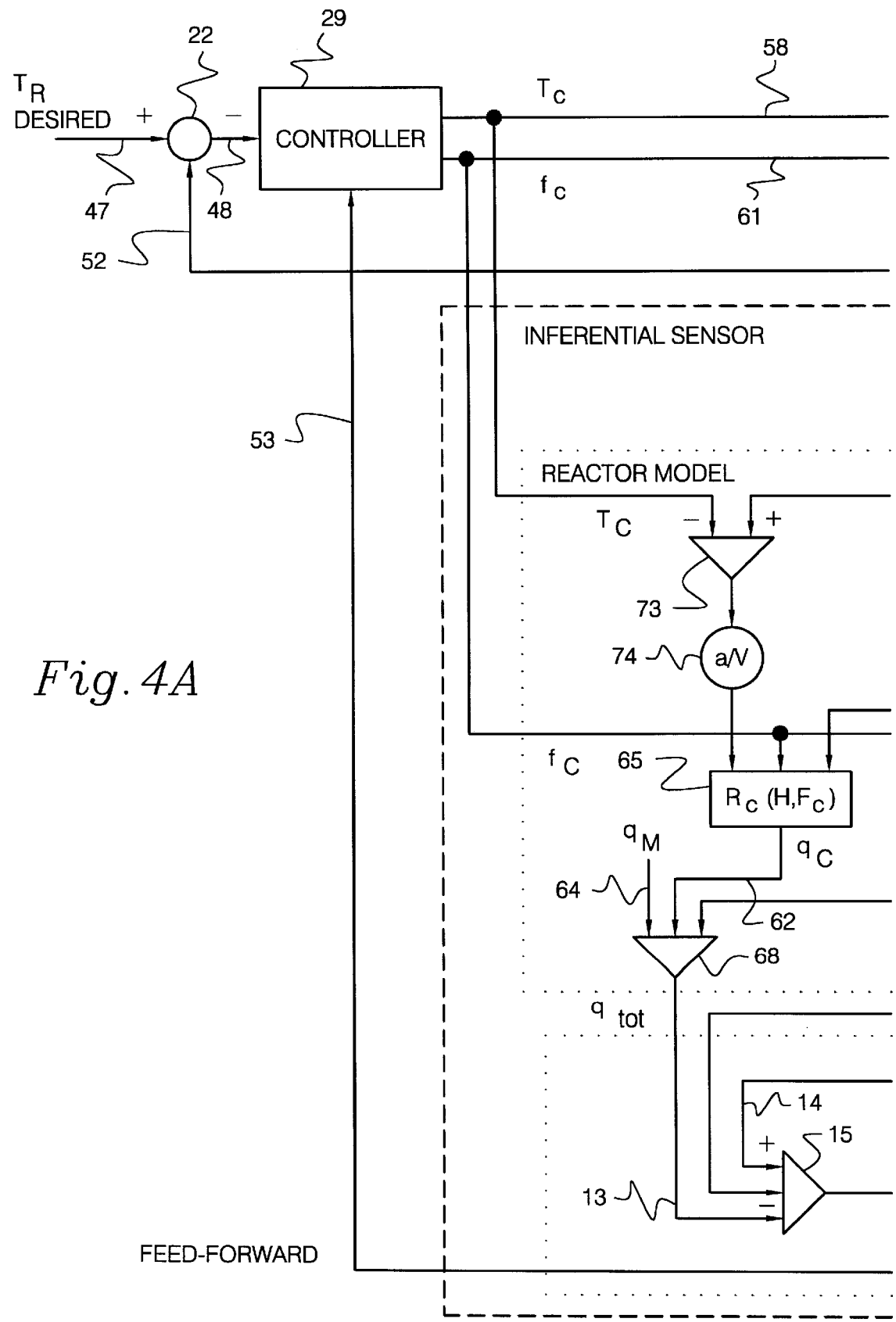
FIG. 4 shows an improved temperature feedback control for a batch polymerization process, wherein the inferred information about the integral reaction heat serves as a feedforward signal for better temperature control. A conventional, state-of-the-art reaction temperature controller has no such feedforward.
Figure 4B:
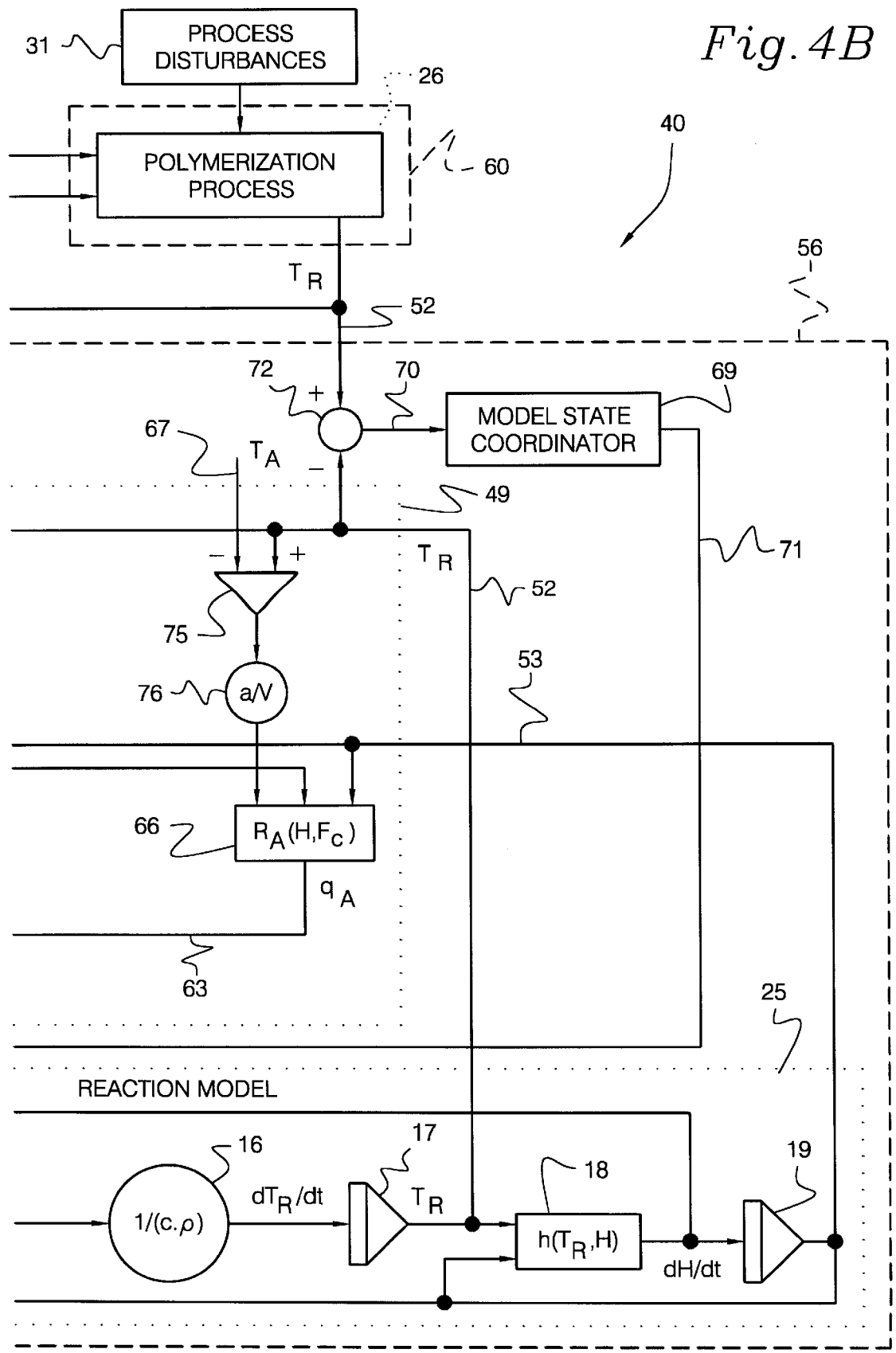

FIG. 4 shows a system 40 having an improvement. This improvement is a feedforward link 53 to a controller 29, which informs the controller about anticipated changes of the integral heat rate caused by process disturbances before they adversely affect the reaction mixture temperature. That information is obtained from a process model 25 which is a part of the inferential sensor. Second, the integral reaction heat serves as the "inner time" of the reaction, which better reflects its actual progress than the ordinary, physical time and is used in this capacity to better time operations to be executed during the batch run. For example, the timing of stirring or mixing in additives is not derived from a clock, but from the integral reaction heat and is thus implicitly or impliedly linked to the degree of monomer conversion.

FIG. 3 shows a feedback 52 execution of a batch recipe in the form of a temperature profile which cannot eliminate the impact of process disturbances on the integral reaction heat, H(t) and, therefore, product quality. In reality, nothing on the process but the reaction mixture temperature $T_R$ is accessible for direct measurement. Of particular interest are the degree of monomer conversion δ and the integral reaction heat rate H.

Block 12 of system 30 is a process model of the heat production in a reactor. Input 13 indicates the amount of heat to be removed from the reaction in the reactor. Input 14 indicates the amount of heat produced by the reaction of the conversion of the monomer to a polymer, or heat rate of the reaction (which may be regarded as including disturbances 31). Differential amplifier 15 outputs the difference of inputs 13 and 14. This output is scaled by a scaling factor (1/cρ) 16. c and ρ may depend on H. c and ρ are heat capacity and specific mass, respectively, of the reaction mixture. The scaled output is a rate of reactor temperature change $dT_R/dt$. This rate is processed by integrator 17 resulting in an output $T_R$ which is the reaction mixture temperature. $T_R$ is input to a heat production rate determiner 18. Block 18 has an integral reaction function h which is applied to reactor temperature $T_R$ and integral reaction heat H. Also inputs are actual process disturbances 31 of the reactor which may include the effects of an inhibitor or initiator, the condition of the reactor, and other factors. The output of block 18 is a rate of heat dH/dt production of the reactor. That output is integrated by integrator 19 to provide the integral reaction heat H. That output H is fed back into block 18 to be processed as a function of h. Also, H goes to a function block 20 that converts or calculates the amount of heat determined into the degree of conversion of the monomer into a polymer in the reactor, at output 21.

System 30 controls the reaction in accordance with desired temperature $T_{R\ desired}$ which is fed along with the actual or calculated integral reaction temperature into a summer 22. The output of summer 22 is the difference of the actual and desired reactor temperatures which goes to controller 23 which determines the amount of heat that should be removed which is to effectively control the cooling water or the temperature of the reaction. Block 24 covers the feedback temperature control of the polymerization process of system 30.

Figure 5A:
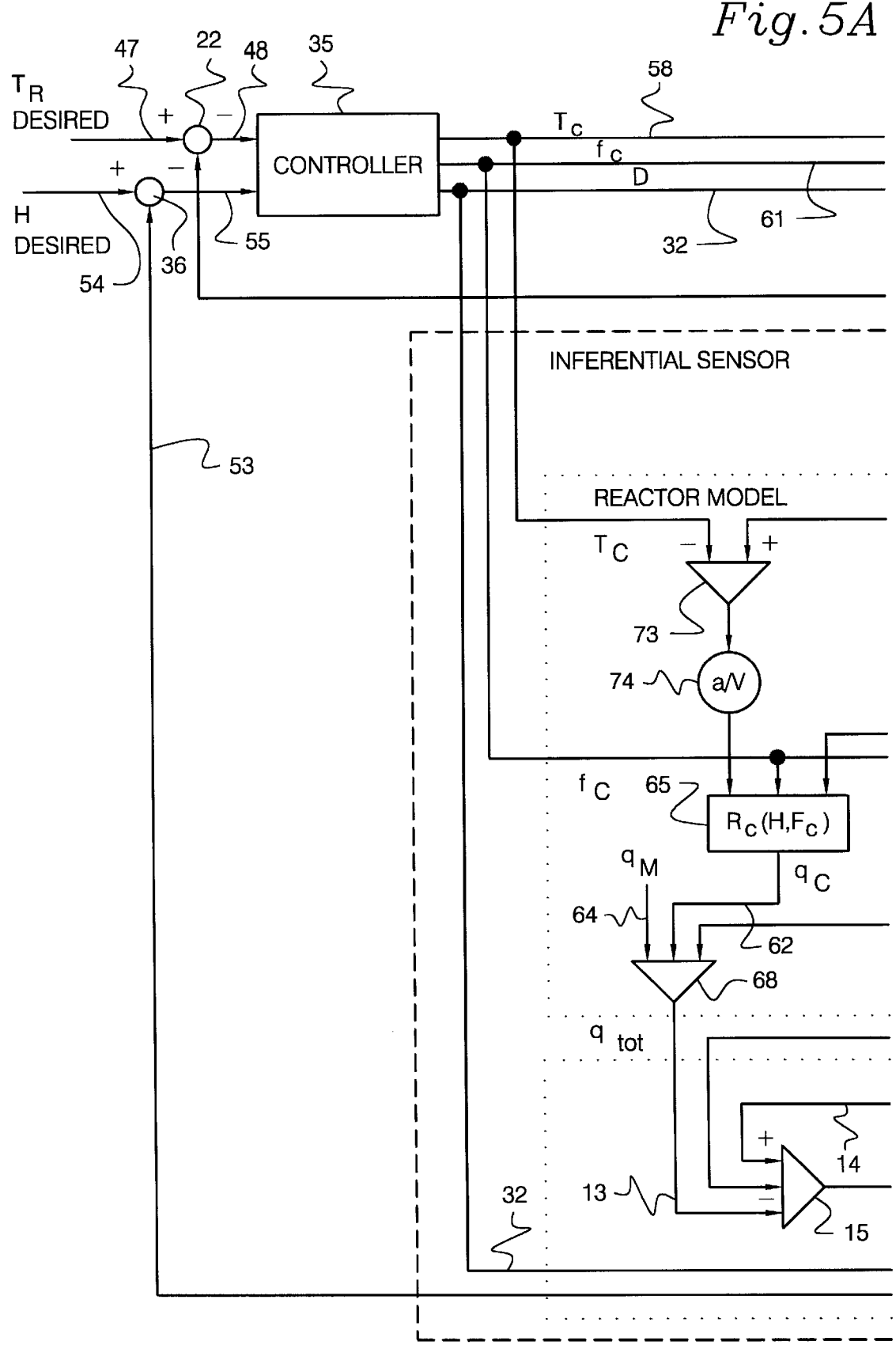
FIG. 5 shows a simultaneous temperature and integral reaction heat feedback control for a batch polymerization process.
Figure 5B:
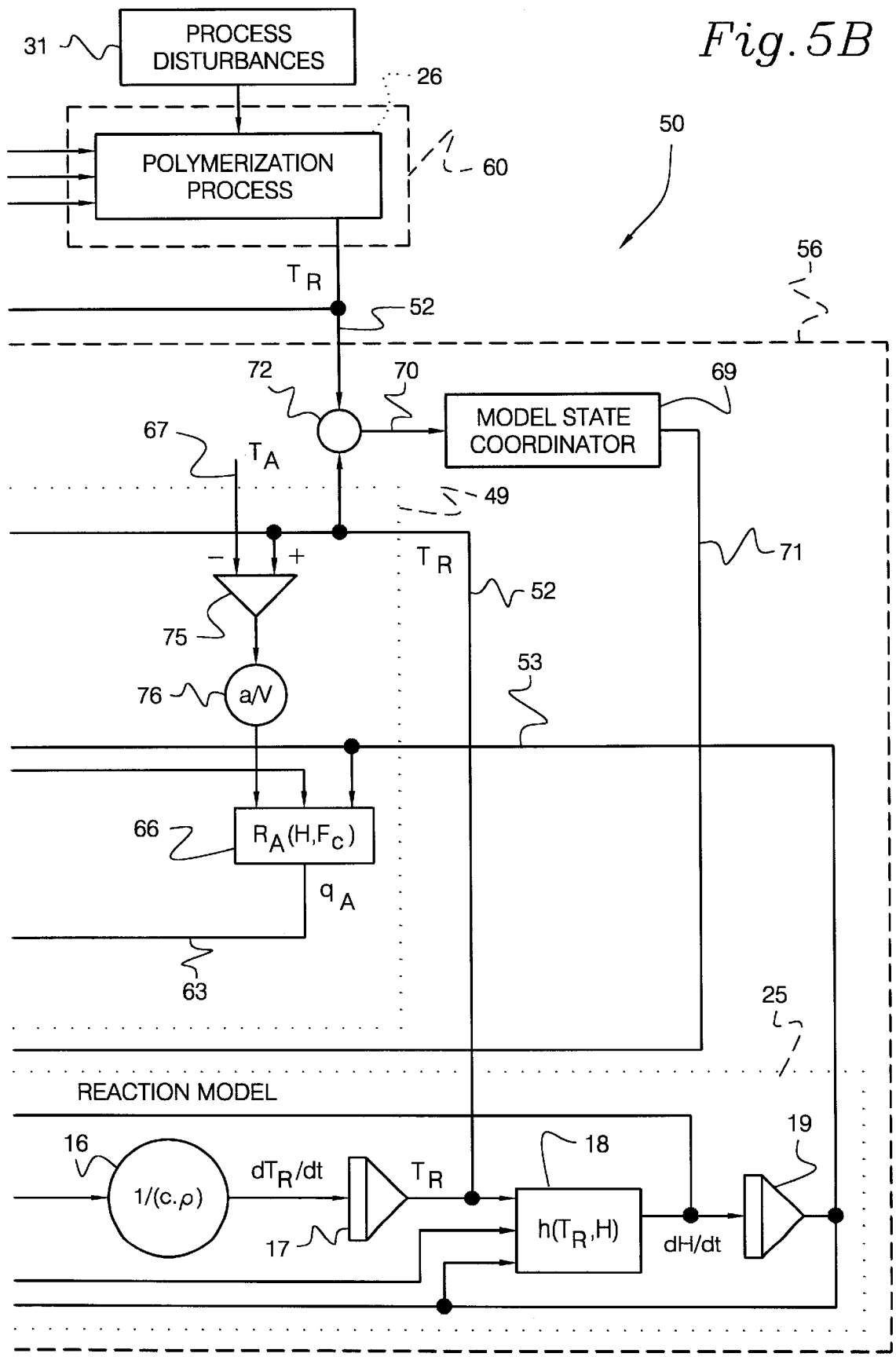

FIG. 4 reveals system 40 which shows how control of the reaction mixture temperature $T_R$ is improved by informing controller 29 about anticipated changes of the integral heat rate H. Here feedback temperature control is affected by a feedforward signal 53 which is an integral reaction heat H indication from integrator 19 of reaction process model 25. Only the reaction temperature $T_R$ is accessible for measurement. In order to estimate H, inferential sensor system 40 involves reaction model 25 process which is maintained in sync with the actual polymerization process in block 26. Reaction model 25 process is not subject to disturbances and nor is the model reaction process temperature $T_R$ utilized as a feedback signal for affecting reaction model 25 process. However, like block 12 of FIG. 3, polymerization process 26 is affected by reaction temperature $T_R$. Feedforward signal 53 indicating the amount of reaction heat of model 25 goes to controller 29. Also to controller 29 is a difference 48 between the desired reaction temperature 47 and the actual reaction temperature 52 from summer 22. In the present invention of FIG. 5, system 50 has a feedback control of reaction temperature $T_R$ 52 and integral reaction heat H 53 (i.e., which indicates a degree of conversion). This involves a modification of the reaction simulation, that is, polymerization process 26 and reaction process model 25, so that they allow for the on-line dosing 32 of initiators (and possibly of an inhibitor as well if the user wants or needs it) as another manipulated variable in addition to the coolant flow to the reactor. This gives the extra degree of freedom needed to control simultaneously and independently both the reaction mixture temperature and the rate of conversion, which are independent, though coupled state variables of the polymerization process. The desired reaction temperature $T_R$ desired 47 is input to summer 22 and combined with the reaction temperature $T_R$ 52 fed back from the output of polymerization process block 26. The output of summer 22 is a difference 48 between the desired reaction temperature 47 and actual reaction temperature $T_R$ 52 and it goes to controller 35. The desired integral reaction heat production $H_{desired}$ 54 and the actual integral reaction heat production H 53 from the output of integrator 19 as indicated by the inferential sensing of reaction model 25 process, are input to summer 36 which outputs a difference 55 of the desired 54 and inferred actual 53 integral reaction heat productions H. This difference 55 is input to controller 35. Multivariable predictive batch controller 35 controls the two variables to their respective set point profiles in a decoupled fashion using the inferential sensor 56 like that of system 40 in FIG. 4, to infer the rate of heat production dH/dt 14. The two outputs $T_c$ 58 and $f_c$ 61 of controller 35 manipulate the amount of heat, $q_{tot}$, via line 13, taken out of the reaction by the reactor's cooling/heating system, and the amount of the initiator/inhibitor, D, via line 32, added into the reactor. Controller 35 accounts for different activities of various initiators or inhibitors that may be used. Reaction model 25 process is a part of inferential sensor 56 of system 50.

Figure 6:
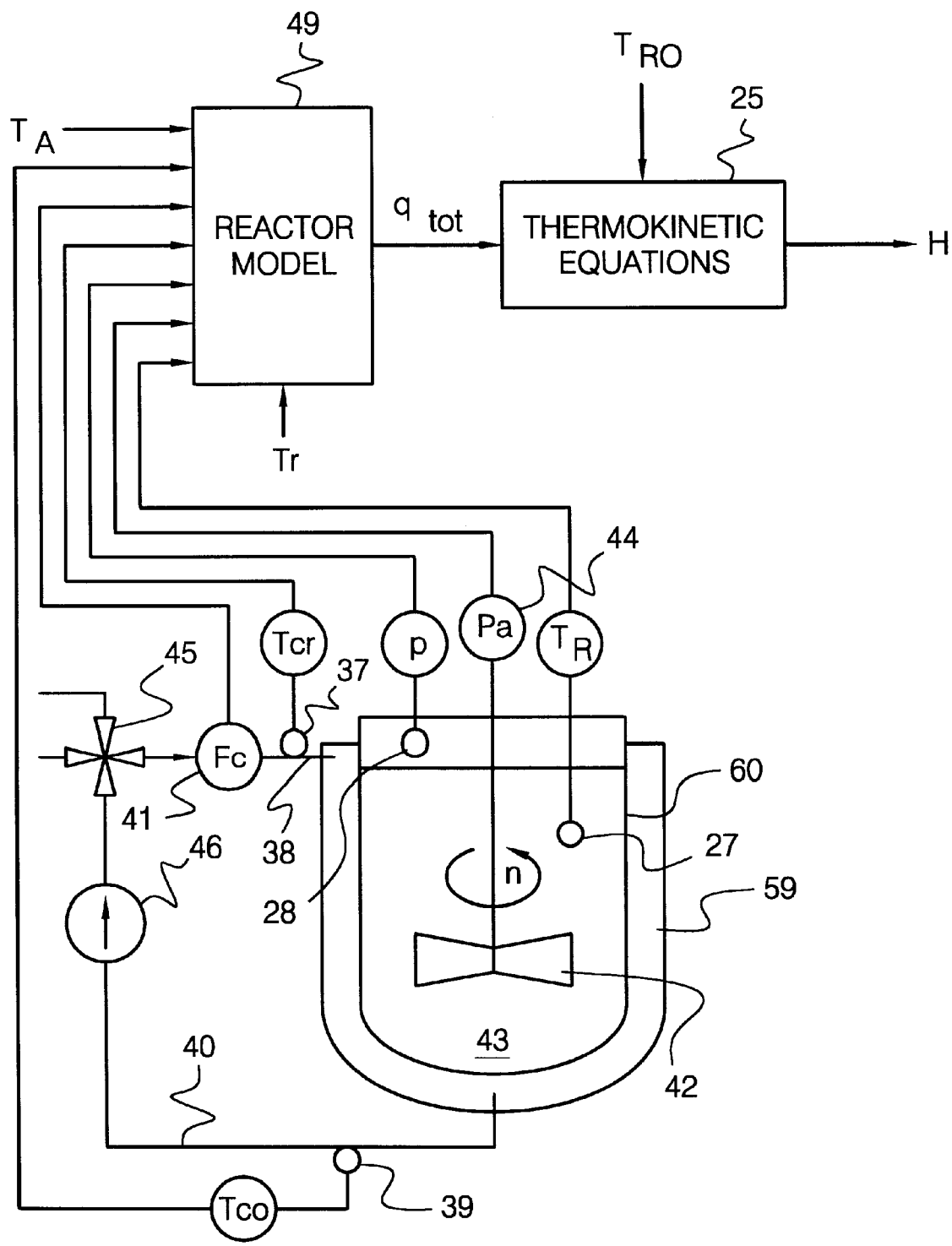
FIG. 6 illustrates a way of estimating integral reaction heat flow from removed heat flow and mixture temperature. In reality, temperatures can be simultaneously measured at more points to better reflect the distributed nature of the chemical process.

One should note that the above is a simplified description of controller 35. Its actual implementation involves more but less significant variables. For example, $q_{tot}$ comprises all heat removal-related variables of the process that allow for manipulation, including water flow through the cooling jacket 59 and coils, and cooling water temperature at inlet 38 and outlet 40, and so forth of the reactor 60 (FIG. 6).

Minimum reactor 60 instrumentation is needed. One turns the thermokinetic equations of a polymerization reaction process 26 into a form of model 25 that is suitable for real time control. Both the form and reactor model 49 involve parameters that need to be estimated on the actual process 26, some of them off-line, some on-line. In order to do so, one collects data on certain process variables. The minimum set of the measured variables is schematically shown in FIG. 6. They are: $T_R$—reaction mixture temperature from temperature sensor 27 in reactor 60; p—reaction mixture pressure from pressure sensor 28 in reactor 60; $T_{CI}$—input cooling water temperature from temperature sensor 37 in water input pipe 38 to reactor 60; $T_{CO}$—output cooling water temperature 58 from temperature sensor 39 in water output pipe 40 from reactor 60; $f_C$—cooling water flow rate 61 from flow sensor 41 in pipe 38; $P_a$—agitation power required to rotate agitator or mixing blade 42 in mixture 43 in reactor 60 at a rate of n revolutions per minute, from sensor 44. Valve 45 provides for the entry of cooling water and the exit of the water from jacket 59 of reactor 60. Pump 46 ensures the flow of the cooling water to and from reactor 60 jacket 59. These measured variables are input to reactor model 49. Induction period length $T_I$ is input to reactor model 49. $T_I$ is the period of time or delay before the polymerization reaction starts after the initiator is added to the batch mixture. An indication of the amount of heat removed from the reaction, $q_{tot}$, is input to block 25 which processes the thermokinetic equations. Also input to block 25 is $T_{R0}$ which is the initial reaction temperature. H, the indicated integral reaction heat 53, is output from block 25. The degree of monomer conversion δ 21 of the batch mixture is inferred from integral reaction heat H 53.

For the reactor model 49 development, it is recommended that one have the reactor blueprint (or at least a sketch of its physical arrangement and dimensions) as well as the placement and quality of the sensors.

The heat that polymerization reactions produce must be removed from a batch reactor by its cooling system. If a reaction is not to end up in a temperature runaway, its heat production rate must be matched by the rate at which the cooling system removes the heat from a reactor. Because the heat production rate is proportional to the rate at which monomer is converted into polymer, it is the cooling system capacity that ultimately limits the yield of the reactor. The optimal utilization of the available cooling capacity of a plant thus becomes a determinant of its product yield.

The direct benefit of using the controller over existing solutions is to get a batch under feedback control both with respect to its reaction speed and mixture temperature and thus tighten the manufacturing specifications which are being constantly threatened by unpredictable variations in the initiator activity and feed impurities. The recipes to be used with the proposed controller are more accurate, because in addition to the temperature profile they also specify the desired degree of monomer conversion profile over the batch run. Since for a class of polymers specified in the approach in FIG. 4 the degree of monomer conversion $\delta$ is proportional to the integral reaction heat H, the batch recipes can be defined directly in terms of H 53, and not of $\delta$, as a function of time, in view of the approach in FIG. 5. This simplifies the controller setup because there is no need to develop the nonlinear transformation block f(H) 20 shown in FIG. 3.

Below are stated the thermokinetic equations (4) and (5), modeled by block 25, of a polymerization reaction. Polymerization reactions are exothermic. The amount of heat being released at any given time, however, is not constant throughout the reaction but varies in time as a function of the reaction mixture temperature and the degrees of conversion of individual monomers involved in the reaction. Let one denote the amount of heat produced by one cubic meter of the reaction mixture per second as $$h(T_R(t), \delta_1(t) \ldots, \delta_N(t)) \quad (1)$$

where $\delta_1(t), \ldots, \delta_N(t)$ are degrees of conversion of various monomers at the time t, and $T_R(t)$ is the mixture temperature, and call it the heat production rate. Its dimension is $[J/m^3.s]$.

The overall amount of heat, H(t), produced since the reaction was started at t=0 is obtained by integrating the differential equation $$\frac{dH(t)}{dt} = h(T_R(t), \delta_1(t), \ldots, \delta_N(t)) \quad (2)$$

and is called the integral reaction heat. Its dimension is $[J/m^3]$.

There is a large class of practically important polymerization reactions, which involve either only one monomer or multiple monomers reacting at the same kinetic rates. Or, to define the class in the most general terms, one can say that its members are distinguished by having a single heat producing reaction, which may be chaining up one or more monomers (as is the case, for example, in the production of nylon). For such reactions, their single degree of conversion, $\delta(t)$, is in a one-to-one relationship, $$\delta(t)=f(H(t)) \quad (3)$$

with the integral reaction heat, H(t), and the equation (2) can be written as follows:

$$\frac{dH(t)}{dt} = h(T_R(t), H(t)) \quad (4)$$

The function $h(T_R(t),H(t))$ is called the heat rate and is specific to a particular process. The released heat, H(t), along with the heat removed from the reaction mixture 43, $q_{tot}(t)$, defines the mixture temperature, $T_R(t)$:

$$c(t) \cdot \rho(t) \cdot \frac{dT_R(t)}{dt} = h(T_R(t), H(t)) - q_{tot}(t) \quad (5)$$

Here c(t) and $\rho(t)$ are the heat capacity and specific mass of the mixture, respectively. Both of them generally change with time as the reaction progresses. Their dimensions are $[J/kg.°K]$ and $[kg/m^3]$, respectively.

$q_{tot}(t)$ is the removed heat flow, that is, the total amount of heat removed from 1 $m^3$ of mixture 43 per second from external sources by all means, i.e., through cooling, heat losses, and so forth. If heat is added, for example through agitation by blade 42, $q_{tot}(t)$ might become negative. Its dimension is $[J/m^3.s]$.

Figure 7:
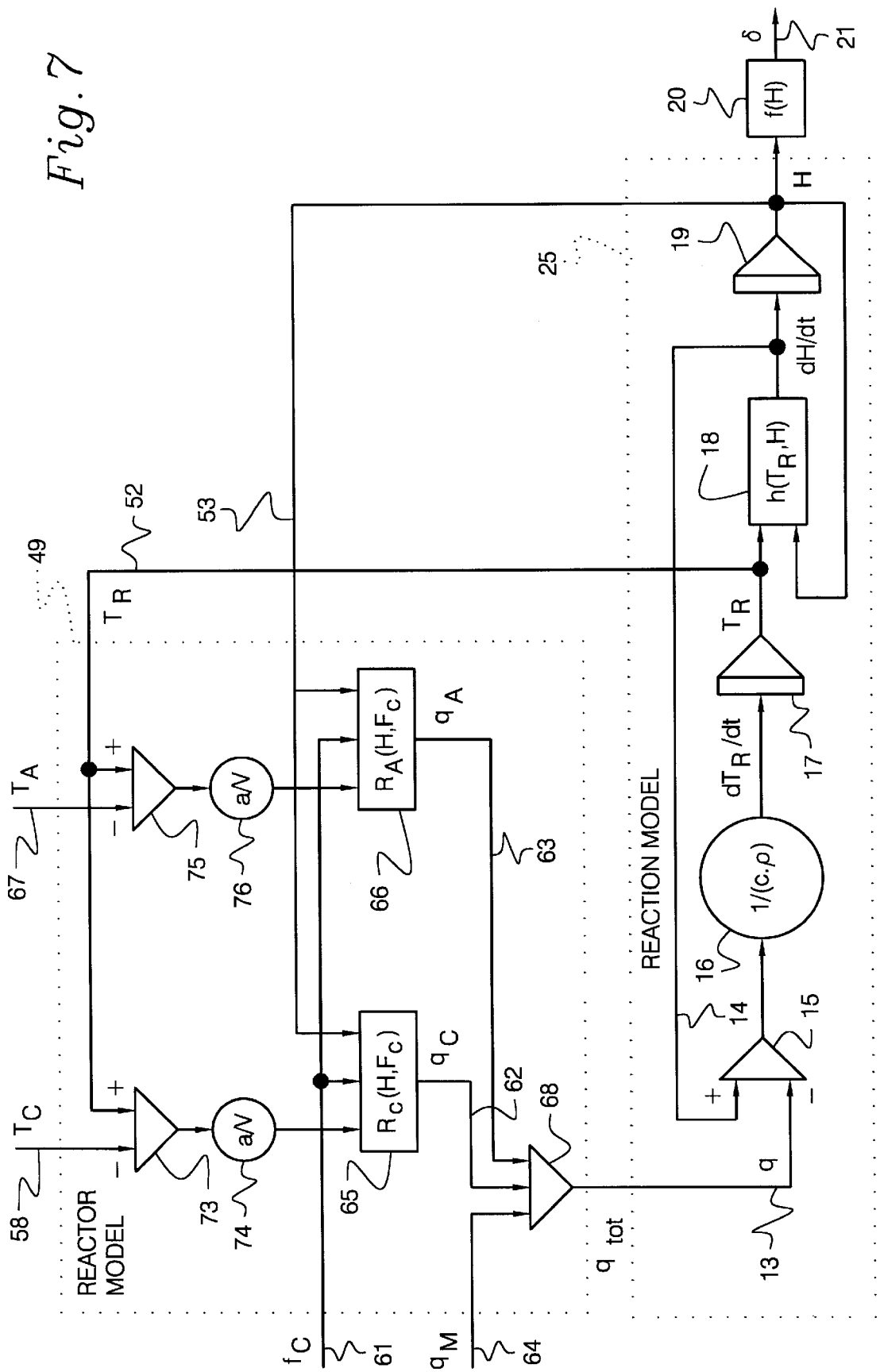
FIG. 7 shows internal couplings of the process variables and their dynamics as described by the thermokinetic equations.

The equations (4), (5) are referred to as the thermokinetic equations of a given polymerization reaction. FIG. 7, in the box named "reaction model" 25 shows a schematic of the application of these equations and their dynamics. It shows their internal structure and mutual couplings of the process variables. Also shown in FIG. 7 are the equations characterizing the heat removal from reactor 60, which are explained below.

For the thermokinetic equations to be valid in the above form, reaction mixture 43 must be perfectly mixed so that its temperature, $T_R(t)$, is uniform throughout the batch reactor volume. For some processes this assumption may be difficult to uphold, particularly toward the end of reaction, when the mixture might gel or even glassify. In such cases, the lumped parameter model of equations (4), (5) must be replaced by a distributed one. For PVC made using the suspension process, a huge water volume present in reactor 60 keeps the mixture viscosity low and makes good mixing possible, thus justifying the use of the lumped model. It also largely suppresses the effects of progressing polymerization on the specific heat and weight (i.e., specific mass) of mixture 43. Therefore, one assumes c(t) and $\rho(t)$ to be constant throughout the batch. Furthermore, to simplify the notation, one can drop the time t from certain symbols in the equations and figures.

Similar assumptions are applicable for many other polymerization processes as well. If some of them are not, then it is possible to modify the mathematical form of the exothermic equations to satisfy the technicalities, while retaining the idea of using them.

In order for the thermokinetic equations to be applicable for inferential sensing and control, one has to determine the heat rate $h(T_R(t),H(t))$ and the total amount of heat $q_{tot}$ removed from the process. Let one postpone the former until later and outline now how to obtain the latter.

Heat is usually removed in several ways simultaneously, the major one being through the cooling system. Others are heat losses to the ambient due to lack of reactor insulation, heat escaping in gases intentionally released to maintain reactor pressure, heat absorbed by added reactants to bring them to the mixture temperature, etc. There might also be heat flow entering the reaction, however, most notably through the energy needed to agitate mixture 43. Let one consider the total heat to be a sum of three major components, $$q_{tot}=q_C+q_A+q_M,$$

where $q_C$ is heat 62 removed through the reactor's cooling system, $q_A$ is heat 63 escaping into the ambient through the reactor insulation (if there is any at all), and $q_M$ is a "catch-all" term introduced to account for miscellaneous other heat escape routes, termed as miscellaneous heat 64. Depending on particular process, some of them may be significant enough to deserve to be explicitly modeled. The sum of $q_C$, $q_A$ and $q_M$ is achieved by summing amplifier 68 as an ouput $q_{tot}$ signal 13 to amplifier 15 of reaction model 25. Heat flux 62 crossing the reactor wall from the mixture into the cooling medium is $$q_C = \frac{R_c(H, f_C) a_C (T_R - T_C)}{V},$$

where $R_C(H, f_c)$ is the heat transfer coefficient 65 from mixture 43 into the coolant, which generally depends on the mixture viscosity which, in turn, is related to the degree of conversion and thus to the integral heat H as well, and also on the coolant flow $f_c$ 61, $T_R$ is the reaction mixture temperature 52, $T_C$ is the coolant temperature 58, $a_C$ is the area of the wall across which the transfer happens, and V is the mixture 43 volume.

Although the above expression is correct, it cannot be used in this simple way to actually calculate $q_C$ because the coolant temperature $T_C$ in the jacket is not uniform. Nevertheless, in conjunction with the thermokinetic equations it conceptually explains the controller 35 affects the polymerization by adjusting the coolant temperature 58. Because the actual coolant temperature raises as the coolant flows through the jacket, the average temperature can also be decreased by increasing the coolant flow $f_c$ 61 and vice versa.

A similar formula holds for the heat flux 63 escaping into the ambient:

$$q_A = \frac{R_A(H, f_C) a_A (T_R - T_A)}{V}.$$

$R_A(H, f_c)$ is the heat transfer function coefficient 66 from mixture 43 into the ambient. Of course, there is no way one can manipulate the ambient temperature $T_A$, but its measurement is used as a feedforward signal 67 to better estimate this heat loss 63. For highly viscous mixtures 43, power 44 needed to agitate them may be large enough to demand its explicit inclusion as a heat contributor.

Reaction model 25 process is synchronized with actual polymerization process 26 by model state coordinator 69. Synchronization or coordination is cued from a comparison signal 70 from differential summer 72 having as inputs reaction temperatures $T_R$ 52 from polymerization process 26 and reaction model 25, by coordinator 69 which outputs a synchronizing or coordination signal 71 to amplifier 15 of reaction model 25 to maintain the state of model 25 to be the same as that of process 26.

Coolant temperature $T_C$ signal 58 and reaction temperature $T_R$ signal 52 are summed by amplifier 73. The output of amplifier 73 is multiplied by coefficient a/V 74 where a is the surface area of reactor 60 where heat exchange is taking place. The output from coeficient block 74, along with $f_c$, signal 61 and H signal 53 goes to heat transfer coefficient block 65 which outputs a $q_c$ signal 62.

Ambient temperature $T_A$ signal 67 and reaction temperature $T_R$ signal 53 are summed by amplifier 75. The output of amplifier 75 is multiplied by coefficient a/V 76 where a is the surface area of reactor 60 where heat exchange is taking place. The output from coeficient block 76, along with $f_c$ signal 61 and H signal 53, goes to heat transfer coefficient block 66 which outputs a $q_A$ signal 63. Amplifier 68 receives $q_c$ signal 62, $q_A$ signal 63 and miscellaneous heat $q_M$ signal 64 and sums them into an ouput $q_{tot}$ signal 13 fed to amplifier 15.

Conventional batch controls cannot guarantee product consistency. Assume that a recipe specifies a desired batch temperature profile, $T_{Rdesired}(t)$, 47, and a conventional temperature control system ensures that this profile is perfectly followed by actual reactor temperature $T_R$ 52, i.e., $$T_R(t) = T_{Rdesired}(t)$$

Now consider two batches in which different amounts of the initiator (catalyst), as prescribed by signal 32, were used. Different initiator concentration causes the two reactions run at different speeds and, consequently, their heat production rates as well as their integral heats will differ:

$$h^{(1)}(T_R, H^{(1)}) \neq h^{(2)}(T_R, H^{(2)})$$

Their temperature profiles $T_R$ (t), however, can still be maintained perfectly identical by the temperature control system, which properly manipulates the amounts of heat, $q^{(1)}_{tot}$ and $q^{(2)}_{tot}$, taken out of the mixture by the reactor cooling so that the equations (5) corresponding to each batch hold despite variations in $H^{(1)}(t)$, $H^{(2)}(t)$:

$$c \cdot \rho \cdot \frac{dT_R}{dt} = h^{(1)}(T_R, H^{(1)}) - q^{(1)}_{tot}$$

$$c \cdot \rho \cdot \frac{dT_R}{dt} = h^{(2)}(T_R, H^{(2)}) - q^{(2)}_{tot}$$

Obviously, unless the control system keeps track of how much heat was added to or removed from the mixture as a result of its control actions, then one may not even find out that the two seemingly identical batches actually ran at different conversion speeds.

The present contention is that feedback batch temperature control still runs the batch open loop with respect to the integral heat rate 14, H(t), and also as to the degree of conversion 21, $\delta(t)$, as revealed in FIG. 3. Process disturbances 31 affecting the heat rate, $h(T_R, H)$, which, in turn, also affect the mixture temperature 52, are seen by controller 23 as external disturbances 31 and their thermal effects are rejected, while they are free to let H(t) 53 and, consequently, δ 21 fluctuate without any correction. Feedback execution of a batch recipe in the form of a temperature profile cannot eliminate the impact of process disturbances on H(t) and, therefore, product quality.

A concept of advanced polymerization control has a main idea which is to close the loop using integral reaction heat 53, H(t), output of integrator 19, as a substitute for the desired degree of conversion, δ(t), which would be extremely difficult to measure directly and would require specialty sensors for different polymers. The integral reaction heat H(t) is directly related to product quality. Unless process disturbances 31 are entering the nonlinear mapping f(H) 20, this simplification permits skipping modeling without degrading the control performance. For instance, reaction mixture 43 agitation so vigorous that it impacts the distribution of polymer chains lengths might be an example of such a disturbance. In contrast, FIG. 3 shows temperature $T_R$ feedback 52 rather than the heat H feedback 53.

Usual process disturbances, be they fluctuations of the initiator activity or monomer concentration, effects of impurities and others all show up as changes of the heat rate $h(T_R,H)$. Because the heat capacity and weight of the mixture are either known or can be easily determined, $h(T_R,H)$ is the only missing piece of knowledge. This function of two variables represents a mathematical encoding of chemical facts about the given reaction and therefore will be different for different processes. Some of the facts represent the knowledge that can be extracted beforehand (i.e., off-line) from books or historical data collected on the process. Some other facts, such as initiator activity, depend on so many unmeasurable contributions that the only way to find out is to either measure or estimate it on-line from data collected while the batch to be controlled is already in progress.

To estimate with a reasonable accuracy a function of two variables with no prior information about a process functional form is a formidable task whose completion would require large amounts of data, more than can ever be collected from a single batch run. On the other hand, because a model is needed for controlling the very batch on which data is being collected, one has to develop $h(T_R,H)$ very early into the batch, while it still is in its initial phase, without the luxury of having data from a complete run. This presents a dilemma. On one hand, one knows that $h(T_R,H)$ will always contain something that is specific for each batch run and thus implying that $h(T_R,H)$ be estimated anew in every run. On the other hand, it is clear that data collected at the beginning of a single run would never suffice to compute a good functional estimate.

The answer to resolving this dilemma lies in factoring $h(T_R,H)$ into two components. One component will contain only knowledge that is permanent, independent of a particular run. This component can be established beforehand, using both chemical theories and historical data. Because its computation is done off-line, one is free to use as much data as one pleases and employ sophisticated, but time-consuming algorithms to do the job. The other component will contain only knowledge which is valid only in a particular run and thus needs to be extracted on-line. Because the amount of available run time data is small, the amount of this knowledge must be kept to an absolute minimum. One can safely say that the ability to do the $h(T_R,H)$ factorization correctly is the key to success of the proposed approach. This is the place where expertise in polymer chemistry is necessary in order to come up with factorizations that stand a chance both to reflect the chemical reality and to be fitted using limited amounts of data.

The heat production rate $h(T_R,H)$ is factored. For the sake of explanation, let one think of the estimation of $h(T_R,H)$ as a two step problem. The first step is to estimate the integral reaction heat flow, $dH(t)/dt$, knowing the removed heat flow, $q(t)$, and the mixture temperature, $T_R(t)$. The specific heat, c, and weight, $\rho$, of the mixture are assumed to be known.

This is a trivial problem once one knows $q(t)$. Because heat is an integral quality, it cannot be directly observed and must be computed from temperature and flow measurements. The computation of $q(t)$ for a given reactor is the real challenge in this step. This computation is discussed below.

The second step is to estimate $h(T_R,H)$, knowing the integral reaction heat flow, $dH(t)/dt$, from the first step and the mixture temperature, $T_R(t)$.

The formidable task of function estimation mentioned above, which, in the present application, cannot be solved without a suitable factorization. Here one proposes to factorize $h(T_R,H)$ as a product of two functions of a single variable, $s_T(T_R)$ and $h_H(H)$, and a scaling constant $s_0$, $$h(T_R,H) = s_0 \cdot s_T(T_R) \cdot h_H(H) \qquad (6)$$

and proposes $s_T(T_R)$ to be of this particular form $$s_T(T_R) = e^{\frac{E \cdot (T_R - T_0)}{R_G \cdot T_R \cdot T_0}} \qquad (7)$$

which can be justified by assuming the reaction rate to accelerate with reaction temperature according to Arrhenius. Here E is the activation energy of the polymerization reaction, $R_G$ is the universal gas constant, $T_R$ (t) is the actual temperature profile of the reaction mixture, $T_0$ is the constant reference temperature, $h_H(H)$ is the nominal heat production rate observed at the reference temperature, $s_T(T_R)$ is the temperature factor due to temperature differences, $s_0$ is a "catch-all" scaling factor called the reactivity to account for other variations.

The value of equations (6) and (7) is in allowing one to transform data collected during batches, whose temperature profiles differ from the nominal one, as if they were collected under the nominal conditions. Once one knows how to remove the effects of temperature variations, data from many batches to estimate the nominal heat production rate, $h_H(H)$, can be used. However, before one can remove such effects, knowledge of how to eliminate the effects of initiator activity is needed.

First, accounting of the effects of initiator activity is needed. Many polymerization reactions will not run at all or only at very low conversion speeds unless an initiator (catalyst) is used. Because the initiator activity defines the reaction speed, its effects must be somehow encoded in $h_H(H)$. But the initiator activity is a very volatile aspect which may change from run to run and cause large fluctuations in the batch behavior. Unless one explicitly removes the initiator activity effects out of the historical data and thus, in effect, renormalize the data to a "standard initiator activity profile", the resulting estimate of $h_H(H)$ might easily be a flat average which is not particularly good for any actual batch. Also, if the estimate of $h_H(H)$ is to be of any use for control, one must know how to customize it for every future batch using its actual initiator activity profile.

Before incorporating the initiator effects into $h_H(H)$, a few facts about what happens to the initiator in the course of a polymerization reaction need to be known. Although polymerization reactions do not consume the initiator, its concentration nevertheless keeps falling in the course of a reaction mainly due to two effects. As to the first effect, immediately after adding the initiator to the mixture, the polymerization reaction does not take off immediately. It appears that the initiator's activity is temporarily hindered by impurities present in the input stocks. Among chemical engineers, this delay (denote it $T_I$) is known as the induction period. Because the amount of impurities in a batch is virtually impossible to determine beforehand, both the induction period and the actual initiator concentration at the true beginning of the batch reaction are unknowns that must be estimated on-line.

As to the second effect, many initiators are high energy compounds and as such tend to be chemically unstable. During a batch run, the initiator typically undergoes a spontaneous disintegration which exponentially (or even faster) lowers its concentration in the mixture. Also, long storage of the initiator compound tends to degrade it and unless the initiator activity is measured before its use, the degradation will introduce an unmeasured disturbance into the batch process.

To account for those phenomena, one assumes the following three points. First, the nominal heat production rate is proportional to the initiator concentration, [I]:

$$h_H(H) = [I] \cdot h_I(H) \tag{8}$$

where $h_I(H)$ is also called the nominal heat production rate but this time normalized with respect to both the reaction temperature and the initiator concentration.

Second, the polymerization reaction starts only after the induction period. From the modeling point of view, the period is a pure delay.

The initiator's spontaneous disintegration proceeds as the first order reaction $$\frac{d[I](t)}{dt} = -k_I(T_R(t)) \cdot [I](t) \tag{9}$$

If the initiator is added in the course of a reaction, the equation needs be amended by an appropriate driving force term.

As factorization (8) implies, in order to develop the estimate $h_H(H)$, one has to know both the solution, [I] (t), of equation (9) and the estimate $h_I(H)$. Whereas the latter is always estimated off-line and thus one's choice of a suitable computational method is constrained neither by data availability nor real-time concerns; this is not true for [I] (t). As discussed above, the initiator concentration can vary from batch to batch and thus must be estimated on-line from scarce real time data collected early into the batch run. This severely limits the present options as to how to proceed.

Equation (9) is linear but with a time-varying coefficient, because the kinetic rate, $k_I(T_R(t))$, depends on the reaction temperature $T_R(t)$. Its solution $$[I](t) = [I](T_I) \cdot e^{-\int_{T_I}^{t} k_I(T_R(\tau))d\tau} \tag{10}$$

shows that disintegration is exponential in time and generally accelerates with growing temperature. To fully determine the solution, one has to estimate the initial concentration $[I](T_I)$ at the end of the induction period (i.e., at the beginning of the polymerization reaction), the induction period length $T_I$ and the variable kinetic rate $k_I(T_R)$. The first two are scalar numerical values, which are easy to estimate, the third one is a function of a single variable $T_R$.

If nothing is known about a function being estimated, then one has to construct its estimate by a nonparametric estimation method. However, to produce reliable results such methods generally require so much data that one can rule them out in these circumstances. The only sensible approach seems to be to replace the nonparametric function estimation by a parametric one by inserting a piece of chemistry knowledge regarding the likely form of the function $k_I(T_R)$. Because any estimation based on a limited amount of data is always a tricky business, every piece of knowledge one can get about the resulting function up front without having to estimate it goes a long way in stretching the value of the available data because it greatly reduces the amount of knowledge that needs to be correctly extracted. Below is a possibility for which one can put forth some chemical justification:

Assume the disintegration kinetics to be of the Arrhenius type. Then, one can express $k_I$ as $$k_I(T_R) = k_{I0} \cdot e^{\frac{E_I \cdot (T_R - T_0)}{R_G \cdot T_R \cdot T_0}} \tag{11}$$

where $k_{I0}$ is the kinetic rate constant at the nominal temperature $T_0$, and $E_I$ is the activation energy.

Since $E_I$ can be assumed to be known, the original problem of estimating the function $k_I(T_R)$ boils down to the estimation of the single numerical constant $k_{I0}$.

The initiator concentration drops over time since the moment the initiator was added into the reaction mixture at the time 0. Although the concentration [I] (0) at this moment can perhaps be calculated from the input stock amounts and then projected into the future value $[I](T_I)$ using the equation (10), the actual amount of the initiator at the time $T_I$ can be a way off from such projection due to other unmodeled effects taking place during the induction period. These effects can be brought into consideration by expressing the actual value $[I](T_I)$ as a function of the value [I] (0) as follows:

$$[I_0] = [I](T_I) = s \cdot [I](0) \cdot e^{-\int_{T_I}^{t} k_I(T_R(\tau))d\tau} \tag{12}$$

The scaling constant s represents an uncertainty due to the unmodeled effects and as another multiplicative constant might be eventually included in the reactivity $s_0$ introduced earlier in (6).

The nominal specific reaction heat $h_I(H)$ can be estimated. Finally, one is in a position to devise a complete approach to estimate the nominal heat production rate $h_H(H)$. Recall that one began by explicitly introducing the effects of the initiator concentration [I] in the form $$h_H(H) = [I] \cdot h_I(H)$$

followed by assumptions concerning the initiator disintegration and the delayed onset of the polymerization reaction, $$h_H(H) = [I_0] \cdot e^{-\int_{T_I}^{t} k_I(T_R(\tau))d\tau} \cdot h_I(H)$$

in which one made yet another assumption to convert the estimation from functional to parametric to make the problem solvable using small data sets:

$$h_H(H) = [I_0] \cdot e^{-\int_{T_I}^{t} k_{I0} \cdot e^{\frac{E_I \cdot (T_R(\tau) - T_0(\tau))}{R_G \cdot T_R(\tau) \cdot T_0(\tau)}} d\tau} \cdot h_I(H) \tag{13}$$

The proposed factorization of the heat production rate outlined above should be thought of as a working hypothesis that may need amendments to account for specifics of any particular polymerization process. Hence its validation is the first step to take when applying the approach to a new process.

Now one will consider two estimation problems whose objective is to obtain the factors from experimental data. In both, the function $h_H(H)$ is known from the first step (see the discussion above on factoring the heat production rate), at least for H(t) for t ranging from t=0 up to the current time t or, in the case of archived data, till the end of the batch run, $T_B$. Also, one assumes that the temperature profiles $T_R(t)$ and $T_0(t)$ are available, and the activation constant $E_I$ is known. (If not, then it can be either established independently or estimated like any other parameter.)

The first problem is estimating $h_I(H)$ from archived data. This is an off-line procedure. From a set of N batch records, one first extracts the nominal heat production rates $h_H(H)^{(n)}$, n=1, ..., N. Although the rates all are outcomes of what should be the same polymerization reaction, they will generally differ as a result of different initiator concentration drop rates and other disturbances. Whereas the same desired heat $h_I(H)$ must be universally valid for all batch runs, the constants $T_I^{(n)}, [I_0]^{(n)}, k_{I0}^{(n)}$ are not. One highlights the fact by marking them with the superscript denoting their batch number. Even though the constants are of no use, one has to estimate them for each batch in order to get $h_I(H)$ right and then one simply tosses them.

A possible formulation of the problem is as follows. Let the $h_I(H)$ estimate be expressed in the finite series form $$\hat{h}_I(H) = w_0 + \sum_{m=1}^{M} w_m \cdot \Phi_m(H) \quad (14)$$

where $\Phi_m(H)$, m=1, ..., M is a suitable set of basis functions and $w_0, \ldots, w_M$ are unknown weights.

Because the shape of $h_I(H)$ is basically given by the order of the reaction kinetics, the basis set needs to be defined so that its members reflect the reaction order as well as effects not covered by kinetics (e.g., gelation).

Find $$w_0, \ldots, w_M, T_I^{(1)},[I_0]^{(1)},k_{I0}^{(1)}, \ldots, T_I^{(N)}, [I_0]^{(N)},k_{I0}^{(N)}$$

such that they minimize the fitness criterion $$\min \frac{1}{N} \sum_{n=1}^{N} \int_{T_I^{(n)}}^{T_B} \left( h_H(H)^{(n)} - [I_0]^{(n)} \cdot e^{-\int_{T_I^{(n)}}^{\tau} k_{I0}^{(n)} \cdot e^{-\frac{E_I \cdot (T_R(\tau) - T_0(\tau))}{R_G \cdot T_R(\tau) \cdot T_0(\tau)}} d\tau} \cdot \hat{h}_I(H) \right)^2 dt \quad (15)$$

Aside from its apparent complexity, this is conceptually a plain nonlinear problem.

The second problem is estimating $T_I,[I_0],k_{I0}$ from real time data. This is an on-line procedure used during real time batch control. Its objective is to find the likely values of $T_I,[I_0],k_{I0}$, which characterize the initiator activity in the current batch. Now the heat $\hat{h}_I(H)$ is already known. A possible mathematical formulation of the problem is to find $T_I,[I_0],k_{I0}$ such that they minimize the fitness criterion is $$\min \frac{1}{N} \quad (16)$$

$$\sum_{n=1}^{N} \int_{T_I}^{t} \left( h_H(H) - [I_0] \cdot e^{-\int_{T_I^{(n)}}^{\mu} k_{I0} \cdot e^{-\frac{E_I \cdot (T_R(\tau) - T_0(\tau))}{R_G \cdot T_R(\tau) \cdot T_0(\tau)}} d\tau} \cdot \hat{h}_I(H) \right)^2 d\mu$$

Notice that now the integral runs only up to the current time t. Ideally, the minimum will be recomputed over and over as the batch progresses thus allowing for continuous updates of the initiator activity model. Another approach can incorporate the nonlinear extended Kalman filter theory.

One may develop algorithms to solve the above problems. The removed heat flow q is calculated in the first step on factoring the heat production rate. Once one knows it, the estimation of the heat flow dH/dt is simple. Now one can focus attention on how to calculate qt.

There are several items to note. First, heat is an integral property and thus has to be calculated from instantaneous measurements like those of temperatures, pressures, flows and so forth. Second, heat generated by the polymerization reaction can be stored in the reactor in a number of ways. In other words, the heat that one is measuring as exiting the system through the cooling medium or thermal losses may be only a fraction of the heat that is actually being generated at any given time. To produce a realistic picture of all heat flows requires a meticulous analysis of the production equipment, especially for continuous processes. Third, when it comes to heat transfer, reactors are not uniform. Some parts of reactor walls or coolers do a better job than others and, as a result, one might be forced to describe the reactors by finite element models, even though the simpler, lumped parameter models are sufficient for a number of processes. The models involve heat transfer coefficients that must be experimentally determined to make sure that they agree with the physical reality.

The reactor provides an environment in which the polymerization reaction is executed. It interfaces with the reaction through heat transfer, thus changing the reaction mixture temperature $T_R$ and, consequently, the speed of monomer conversion. However, the interaction works in the other direction as well. Because the heat transfer coefficient at the boundary layer between the mixture and reactor walls, $R_{RW}(H)$, depends on the mixture viscosity, the amount of heat removed from the reaction will depend on the current degree of conversion and thus on the integral reaction heat H, all other things being equal. On the outer side of the wall, the heat is removed by the coolant flowing through the reactor jacket or cooling coils. Because the heat transfer coefficient between the wall and the coolant, $R_{WC}(f_C)$, changes with the coolant flow, $f_C$, which generally is not constant, one must also know the relationship $R_{WC}(f_C)$ for a range of flow values.

The heat transfer coefficient $R_{WC}(f_C)$ (or, rather, heat transfer coefficient function) is not related to a particular polymerization process. Similarly, if the mixture-to-wall coefficient is expressed as a function of viscosity, $R_{RW}$(viscosity), instead of the integral reaction heat, $R_{RW}(H)$, then it would be largely independent of the process, too. It may happen that both coefficients have already been established in process-independent forms by the reactor manufacturer and are provided in the reactor documentation, or they have been measured earlier as a part of some other project. If this is not the case, then the coefficients must be determined experimentally. Of course, if $R_{RW}$ (viscosity) is available, then one still has to determine experimentally the relation between the integral reaction heat and viscosity for the given process:

$$\text{viscosity} = v(H) \quad (17)$$

Sometimes the reactor is cleaned up periodically but not after every batch and a gradual buildup of deposits on the reactor walls may occur. The deposit layer impacts the coefficient $R_{RW}(H)$ which then requires on-line corrections.

When the reaction is in progress, an algorithm involving the concepts described above, but extended to handle both the thermokinetic and reactor model equations as well as the state update in addition to the mere parameter estimation, will keep the models in agreement with the real process. Because of their continuous update, the models are far more accurate than any off-line model established once the system is commissioned. Such models not only improve the performance of model-based process controllers, but have applications beyond the classic control theory field. In particular, the controller can share models with the production planning and scheduling packages. This vertical integration is perhaps the most economically attractive feature of this invention.

In the PVC manufacturing (and possibly other kinds of manufacturing), a comparable product quality can be achieved at different conversion rates as long as the mixture temperature is kept constant. This makes it possible to accelerate or decelerate the reaction, with the only restriction being the ability to remove the released heat. The cooling capacity, though, is always limited. In principle, the scheduler either knows or can decide how much cooling capacity can be allocated to each reactor at any particular time a few hours ahead. An optimizer then can custom-design the integral heat (or degree of conversion) recipe for the reactor so that while tracking it, the controller will make its cooling duty output match the allocated cooling capacity and dose the initiator/inhibitor so as to maintain the mixture temperature constant. This will guarantee the fastest reaction for the desired temperature, and thus will maximize the reactor throughput. At the same time, better models will make planning and optimization more reliable, thus reducing the need for large safety margins without endangering the plant safety.

We claim:

1. A batch polymerization process control device for controlling a batch process in a reactor, comprising:
   a controller connected to the reactor, for receiving a process temperature feedback signal from said reactor and providing reactor cooling control signals to said reactor; and
   an inferential sensor, connected to said reactor and to said controller, for receiving parameter signals from said reactor, providing a reaction model heat feedforward signal to said controller, and receiving reactor cooling control signals from said controller.

2. The batch polymerization process control device of claim 1, wherein said controller comprises a summer for receiving the process temperature feedback signal and a predetermined process temperature signal, and outputting a signal indicating a difference between the process temperature and the predetermined process temperature.

3. The batch polymerization process control device of claim 2, wherein said inferential sensor comprises:
   a reactor model wherein said reactor model receives parameter signals from said reactor and the reactor cooling control signals from said controller and outputs a signal indicating total heat removed from said reactor; and
   a reaction model for receiving the signal indicating the total heat removed from said reactor and providing the reaction model heat feedforward signal to said controller and to said reactor model.

4. The batch polarization process control device of claim 3, inferential sensor further comprising a coordinator for receiving a reaction model temperature signal from said reaction model and the process temperature feedback signal from said reactor, coordinating corresponding states of activity and simulated activity of said reactor and said reactor model, respectively, and outputting a coordinating signal.

5. The batch polarization process control device of claim 4, wherein said reaction model comprises:
   a combiner for receiving the signal indicating the total heat removed from said reactor and the coordinating signal, and having an output;
   a scale factor adjuster having an input connected to the output of said combiner, and having an output;
   a first integrator having an input connected to the output of said scale factor adjuster, and having an output that provides the reaction model temperature signal to said reactor model and to said coordinator;
   a first processor having an input connected to the output of said first integrator, having an output for providing a rate of reaction model heat production signal to said combiner; and
   a second integrator having an input connected to the output of said first processor and having an output for providing the reaction model heat feedforward signal to said controller, to said reactor model, and to the input of said first processor.

6. The batch polymerization process control device of claim 5, wherein said reaction model further comprises a second processor having an input connected to the output of said second integrator of said reaction model, and having an output, wherein said second processor converts the reaction model heat feedforward signal into a signal indicative of a degree of the polymerization process of the process in said reactor.

7. A batch polymerization process control device for controlling a batch process in a reactor, comprising:
   a first summer for receiving a reaction model heat feedback signal and a predetermined reaction heat signal and outputting a heat difference signal;
   a second summer for receiving a process temperature signal from said reactor and a predetermined process temperature signal and outputting a process temperature difference signal;
   a controller for receiving the heat difference signal and the process temperature difference signal and providing a dosing signal and reactor cooling control signals to said reactor; and
   an inferential sensor, connected to said reactor and to said controller, for receiving parameter signals from the reactor, providing a reaction model heat feedback signal to said controller, and receiving the reactor cooling control signals from said controller.

8. The batch polymerization process control device of claim 7, wherein said inferential sensor comprises:
   a reactor model wherein said reactor model receives some parameter signals from said reactor and the reactor cooling control signals from said controller and outputs a signal indicating total heat removed from said reactor; and
   a reaction model for receiving the signal indicating the total heat removed from said reactor and providing the reaction model heat feedback signal to said first summer and to said reactor model.

9. The batch polymerization process control device of claim 8 inferential sensor further comprising a coordinator for receiving a reaction model temperature signal from said reaction model and the process temperature signal from said reactor, coordinating corresponding states of activity and simulated activity of said reactor and said reactor model, respectively, and outputting a coordinating signal.

10. The batch polymerization process control device of claim 9, wherein said reaction model comprises:

a combiner for receiving the signal indicating the total heat removed from said reactor and the coordinating signal, and providing an output;

a scale factor adjuster having an input connected to the output of said combiner, and having an output;

a first integrator having an input connected to the output of said scale factor adjuster, and having an output that provides the reaction model temperature signal to said reactor model and to said coordinator;

a first processor for receiving the dosing signal from said controller, having an input connected to the output of said first integrator, and having an output for providing a rate of reaction model heat production signal to said combiner; and a second integrator having an input connected to the output of said first processor and having an output for providing the reaction model heat feedback signal to said first summer, to said reactor model, and to the input of said first processor.

11. The batch polymerization process control device of claim 10, wherein said reaction model further comprises a second processor having an input connected to the output of said second integrator of said reaction model, and having an output, wherein said second processor converts the reaction model heat feedback signal into a signal indicative of a degree of polymerization of the batch process in said reactor.

* * * * *